(12) United States Patent
Ohki

(10) Patent No.: US 8,497,931 B2
(45) Date of Patent: Jul. 30, 2013

(54) IMAGE TAKING OPTICAL SYSTEM AND IMAGE PICKUP APPARATUS EQUIPPED WITH SAME

(75) Inventor: Sanae Ohki, Tokyo (JP)

(73) Assignee: Olympus Corporation, Tokyo (JP)

( * ) Notice: Subject to any disclaimer, the term of this patent is extended or adjusted under 35 U.S.C. 154(b) by 174 days.

(21) Appl. No.: 13/231,209

(22) Filed: Sep. 13, 2011

(65) Prior Publication Data

US 2012/0069239 A1    Mar. 22, 2012

(30) Foreign Application Priority Data

Sep. 22, 2010 (JP) ................................. 2010-211937

(51) Int. Cl.
    *H04N 5/225* (2006.01)
(52) U.S. Cl.
    USPC ............................ 348/360; 348/361; 359/715
(58) Field of Classification Search
    USPC ................... 348/335, 360, 361; 359/715, 773
    See application file for complete search history.

(56) References Cited

U.S. PATENT DOCUMENTS

| | | | |
|---|---|---|---|
| 2007/0008625 A1 | 1/2007 | Park et al. | |
| 2007/0070234 A1* | 3/2007 | Sun | 348/335 |
| 2008/0043346 A1* | 2/2008 | Sano | 359/715 |
| 2008/0291551 A1* | 11/2008 | Sato et al. | 359/716 |
| 2010/0097710 A1 | 4/2010 | Lai et al. | |

FOREIGN PATENT DOCUMENTS

| | | | |
|---|---|---|---|
| JP | 2002365530 A | 12/2002 | |
| JP | 2008-185880 A | 8/2008 | |
| JP | 2008-268946 A | 11/2008 | |
| JP | 2009151113 A | 7/2009 | |

* cited by examiner

*Primary Examiner* — Tuan Ho
*Assistant Examiner* — Fayez Bhuiyan
(74) *Attorney, Agent, or Firm* — Brosemer, Kolefas & Associates, LLC

(57) ABSTRACT

An image taking optical system includes, in order from the object side, a stop, a first lens having a biconvex shape and having a positive refractive power, a second lens having a concave surface facing the image side and having a negative refractive power, a third lens having a convex surface facing the image side and having a positive refractive power, and a fourth lens having a negative refractive power. The image taking optical system satisfies the conditional expression "0.6<d5/(d5+d6)<0.8", where d5 is the air distance between the second lens and the third lens on the optical axis, and d6 is the thickness of the third lens.

12 Claims, 15 Drawing Sheets

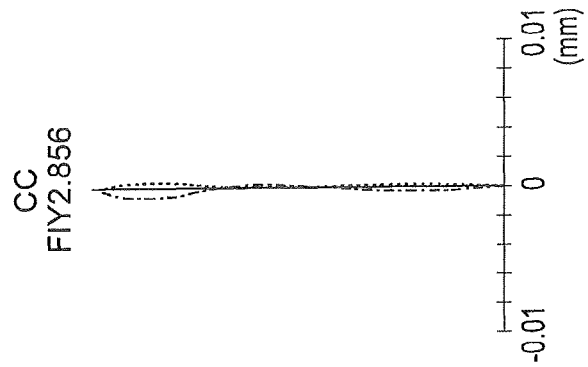
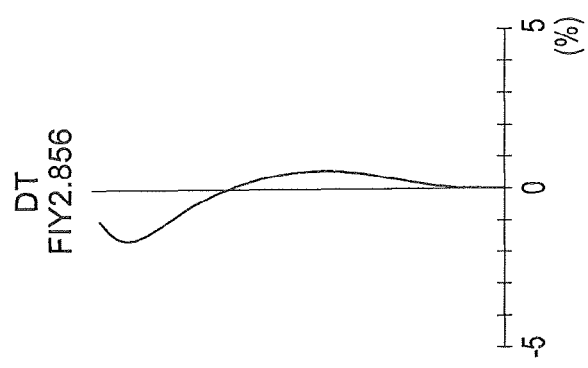
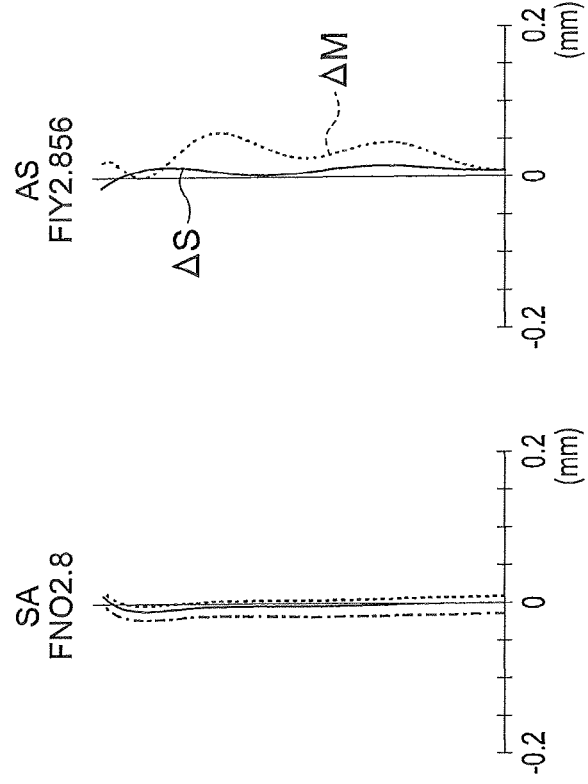
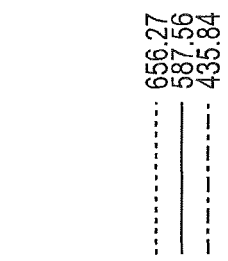

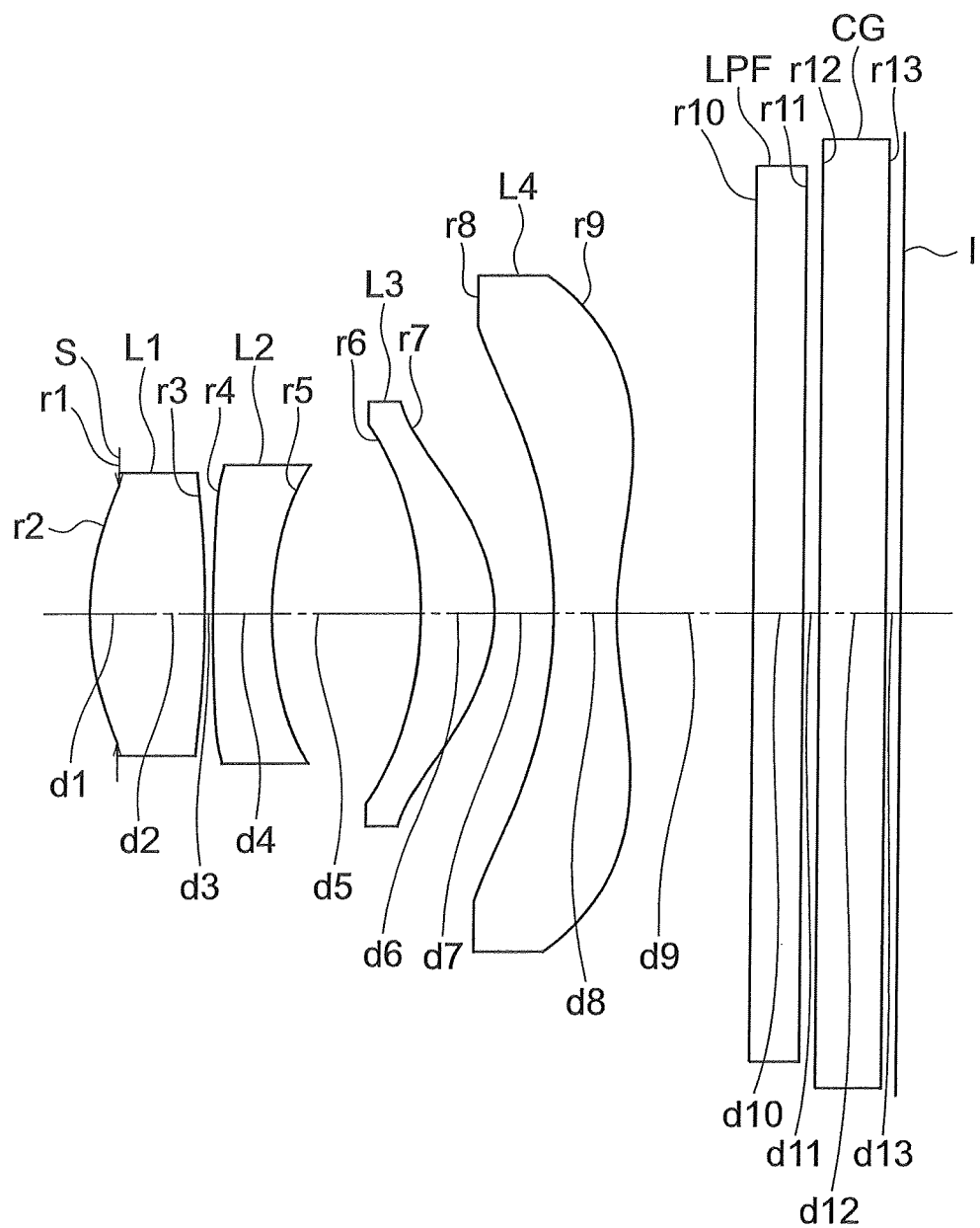

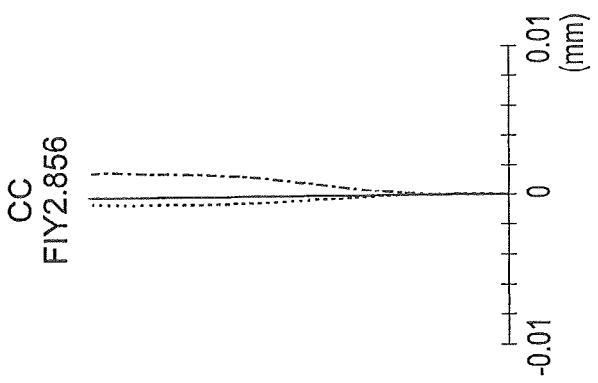

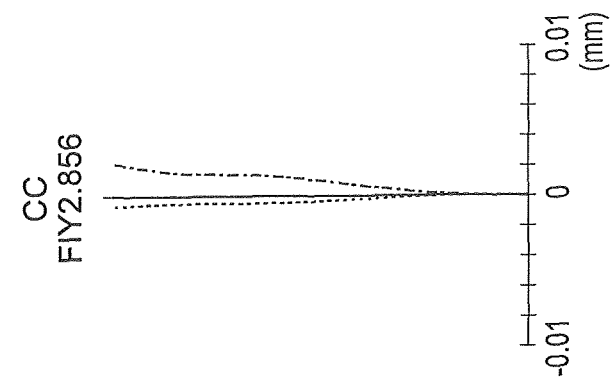
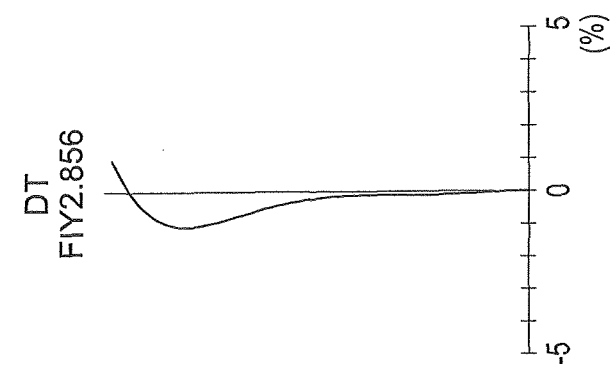
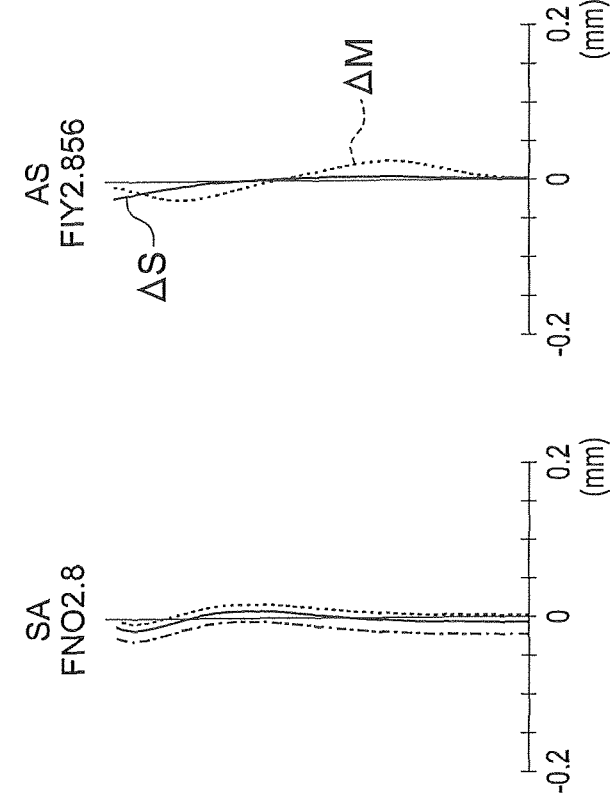
FIG. 6A   FIG. 6B   FIG. 6C   FIG. 6D

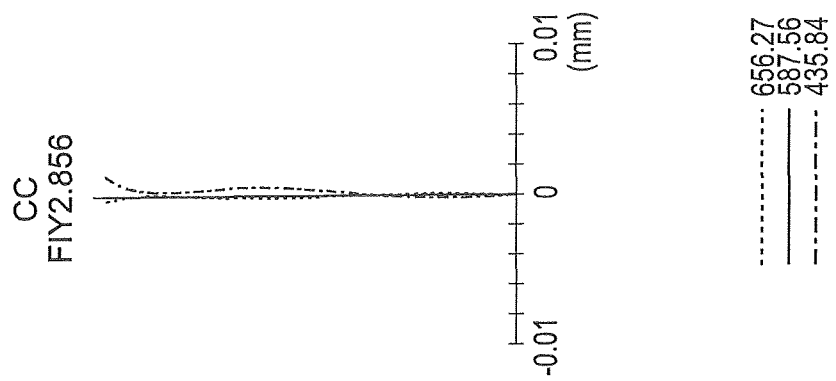
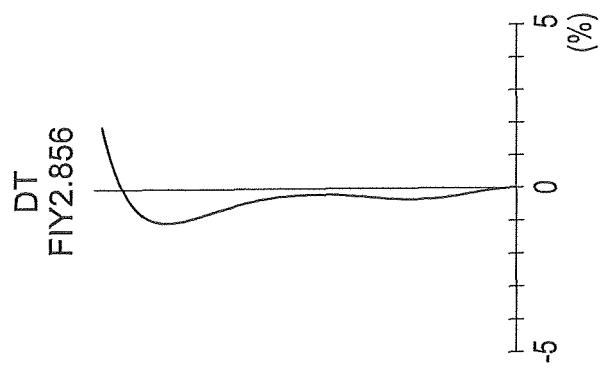
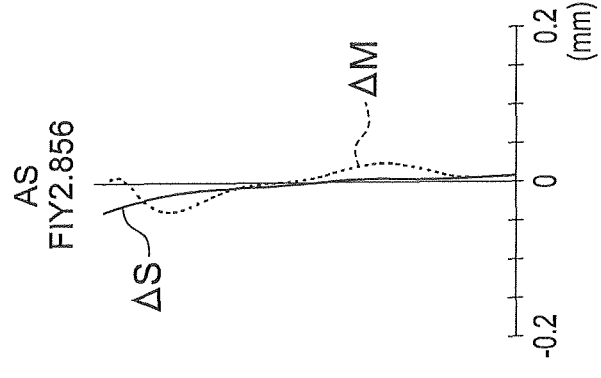
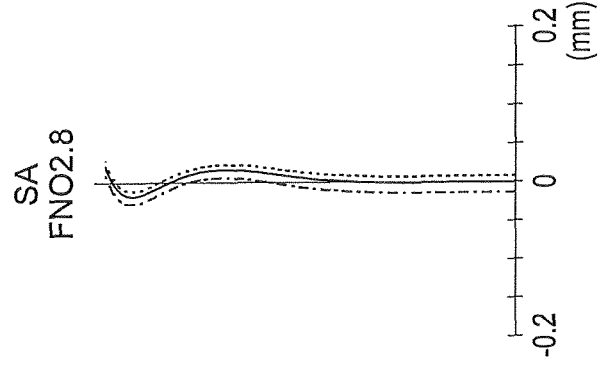

IMAGE TAKING OPTICAL SYSTEM AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2010-211937 filed on Sep. 22, 2010; the entire contents of which are incorporated herein by reference.

BACKGROUND OF THE INVENTION

1. Field of the Invention

The present invention relates an image taking optical system and an image pickup apparatus equipped with same.

2. Description of the Related Art

With slimming of cellular phones, portable digital assistances, and notebook computers in these years, camera modules with an optical system having an extremely short length along the optical axis are demanded. To meet this demand, many optical systems having a short focal length composed of two or three aspheric lenses have been developed.

In recent years, on the other hand, with technical progress in the field of image pickup elements and an increasing need in the market, small, low-price camera modules having a large number of pixels and a wide angle of view are demanded. Optical systems composed of four lenses having a reduced overall length and improved imaging performance have been developed.

For instance, the image taking lens disclosed in Japanese Patent Application Laid-open No. 2008-268946 and the image taking lens disclosed in Japanese Patent Application Laid-open No. 2008-185880 are composed of four lenses in which correction of chromatic aberration is excellently achieved to enhance the resolving power suitable for use with an image pickup element having an increased number of pixels, though they are small in size.

SUMMARY OF THE INVENTION

An image taking optical system according to the present invention comprises, in order from the object side, a stop, a first lens having a biconvex shape and having a positive refractive power, a second lens having a concave surface facing the image side and having a negative refractive power, a third lens having a convex surface facing the image side and having a positive refractive power, and a fourth lens having a negative refractive power, wherein the image taking optical system satisfies the following conditional expression (1):

$$0.6 < d5/(d5+d6) < 0.8 \tag{1},$$

where d5 is the air distance between the second lens and the third lens on the optical axis, and d6 is the thickness of the third lens.

An image pickup apparatus according to another aspect of the present invention comprises the above-described image taking optical system and an electronic image pickup element having an image pickup surface, wherein the image taking optical system is equipped with an integral auto-focus mechanism.

BRIEF DESCRIPTION OF THE DRAWINGS

FIGS. 2A, 2B, 2C and 2D show spherical aberration, astigmatism, distortion, and chromatic aberration of magnification of the image taking optical system according to the first embodiment in the state in which the optical system is focused on an object point at infinity;

FIG. 3 is cross sectional view taken along the optical axis, showing the optical configuration of an image taking optical system according to a second embodiment of the present invention in the state in which the optical system is focused on an object point at infinity;

FIGS. 4A, 4B, 4C and 4D show spherical aberration, astigmatism, distortion, and chromatic aberration of magnification of the image taking optical system according to the second embodiment in the state in which the optical system is focused on an object point at infinity;

FIGS. 6A, 6B, 6C and 6D show spherical aberration, astigmatism, distortion, and chromatic aberration of magnification of the image taking optical system according to the third embodiment in the state in which the optical system is focused on an object point at infinity;

FIGS. 8A, 8B, 8C and 8D show spherical aberration, astigmatism, distortion, and chromatic aberration of magnification of the image taking optical system according to the fourth embodiment in the state in which the optical system is focused on an object point at infinity;

FIG. 15A is a front view of the cellular phone 400, FIG. 15B is a side view of the cellular phone 400, and FIG. 15C is across sectional view of the taking optical system 405.

DETAILED DESCRIPTION OF THE INVENTION

Figure 1:
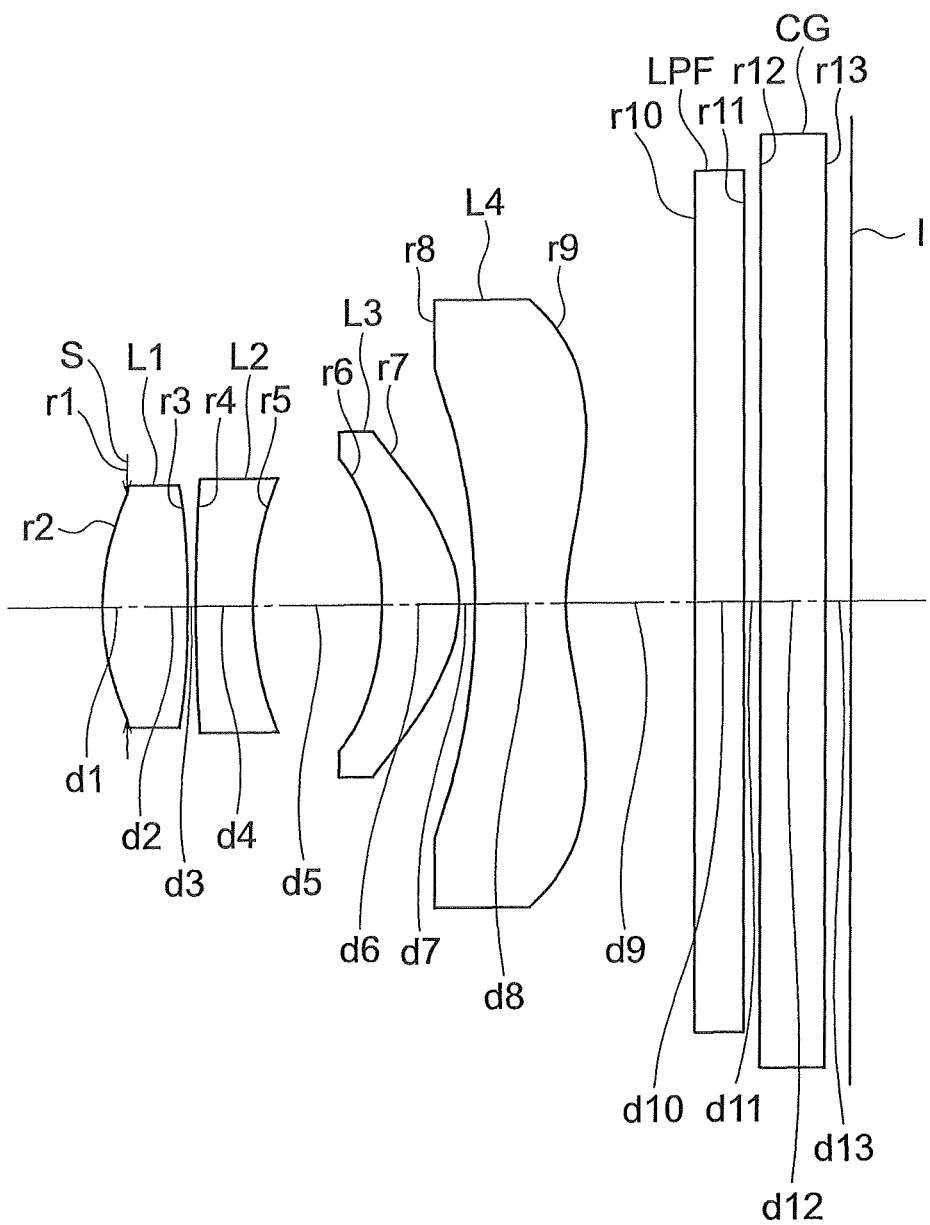
FIG. 1 is cross sectional view taken along the optical axis, showing the optical configuration of an image taking optical system according to a first embodiment of the present invention in the state in which the optical system is focused on an object point at infinity.

Prior to the description of examples, the operation and effects of the image taking optical system according to an embodiment will be described.

An image taking optical system according to the embodiment includes, in order from the object side, a stop, a first lens having a biconvex shape and having a positive refractive power, a second lens having a concave surface facing the image side and having a negative refractive power, a third lens having a convex surface facing the image side and having a positive refractive power, and a fourth lens having a negative refractive power, wherein the image taking optical system satisfies the following conditional expression (1):

$$0.6 < d5/(d5+d6) < 0.8 \tag{1},$$

where d5 is the air distance between the second lens and the third lens on the optical axis, and d6 is the thickness of the third lens.

In the image taking optical system according to the embodiment, the stop is located closest to the object side among the optical components of the image taking optical system. With this feature, the position of the exit pupil can be made distant from the image plane. In consequence, the angle of off-axis principal rays incident on the peripheral portion of the image pickup element will be small. Therefore, a decrease in light quantity in the peripheral portion of the image pickup element can be prevented.

In the lens configuration, it is possible to make the overall length satisfactorily small relative to the focal length by arranging the principal point in such a way as to be located on the object side of the optical system. Thus, a reduction in the overall length can be achieved.

Conditional expression (1) defines the relationship between the second lens and the third lens. Satisfying conditional expression (1) enables excellent correction of high order curvature of field, distortion, and coma.

If the lower limit of conditional expression (1) is not reached, the difference between the ray height of off-axis beams in the second lens and that in the third lens will be small. Then, it will be difficult to achieve satisfactory correction of aberrations by the third lens. Since the third lens is intended to provide correction of high order curvature of field and distortion in particular, correction of these aberrations will be difficult.

If the upper limit of conditional expression (1) is exceeded, the distance between the second lens and the third lens will be large, and the difference in the ray height of the off axis beams will also be large. Then, the diameter of the bundle of beams incident on the third lens will be small, making correction of coma difficult.

It is more preferred that the following conditional expression (1') be satisfied instead of conditional expression (1):

$$0.6 < d5/(d5+d6) < 0.7 \tag{1'}.$$

It is still more preferred that the following conditional expression (1") be satisfied instead of conditional expression (1):

$$0.61 < d5/(d5+d6) < 0.68 \tag{1"}.$$

It is preferred that the image taking optical system according to the embodiment satisfies the following conditional expression (2), $$2 < (r6+r7)/(r6-r7) < 3 \tag{2},$$

where r6 is the paraxial radius of curvature of the object side surface of the third lens, and r7 is the paraxial radius of curvature of the image side surface of the third lens.

If conditional expression (2) is satisfied, the angle of incidence of rays on the object side surface and the image side surface of the third lens can be made small. Consequently, satisfactory correction of coma can be achieved. Moreover, the length of the optical system can be made small while keeping the telecentricity of the optical system.

If the upper limit of conditional expression (2) is exceeded, the paraxial radius of curvature of the object side surface and the image side surface of the third lens will be unduly large. Then, the angle of incidence of off-axis rays on the object side surface and the image side surface of the third lens will be large. This will make correction of coma difficult.

If the lower limit of conditional expression (2) is not reached, the paraxial radius of curvature of the image side surface of the third lens unit will be unduly small, making the exit angle of off-axis rays exiting from the third lens small. In consequence, it will be difficult to achieve both reduction in the overall length of the optical system while achieving telecentricity.

It is more preferred that the following conditional expression (2') be satisfied instead of conditional expression (2):

$$2 < (r6+r7)/(r6-r7) < 2.8 \tag{2'}.$$

It is still more preferred that the following conditional expression (2") be satisfied instead of conditional expression (2):

$$2 < (r6+r7)/(r6-r7) < 2.6 \tag{2"}.$$

It is preferred that the image taking optical system according to the embodiment satisfies the following conditional expression (3):

$$0.33 < BF/TTL < 0.50 \tag{3},$$

where BF is the distance from the last lens surface to the paraxial image plane, and TTL is the overall optical length of the image taking optical system.

If conditional expression (3) is satisfied, the angle of incidence of off-axis principal rays incident on a sensor can be made small when the effective diameter of the last lens surface is small. Therefore, a decrease in the light quantity in the peripheral region can be prevented.

If the lower limit of conditional expression (3) is not reached, the angle of incidence of off-axis principal rays incident on the sensor will be large, leading to a decrease in the light quantity in the peripheral region.

If the upper limit of conditional expression (3) is exceeded, the back focus will be long. Then, while the angle of incidence of off-axis principal rays incident on the sensor will be small, it will be difficult to make the overall length of the optical system small. Here, BF and TTL are not expressed by equivalent air lengths (or equivalent air distances), but they are actual (physical) lengths.

It is more preferred that the following conditional expression (3') be satisfied instead of conditional expression (3):

$$0.33 < BF/TTL < 0.45 \tag{3'}.$$

It is still more preferred that the following conditional expression (3") be satisfied instead of conditional expression (3):

$$0.33 < BF/TTL < 0.4 \tag{3"}.$$

It is preferred that the image taking optical system according to the embodiment satisfies the following conditional expression (4):

$$40° < \theta < 60° \tag{4},$$

where θ is the largest value of the angle formed by a tangential line of the image side surface of the last lens and a line perpendicular to the optical axis within the effective diameter of the lens.

If conditional expression (4) is satisfied, the angle of incidence of off-axis principal rays incident on the sensor can be made small when the effective diameter of the last lens surface is small, and a decrease in the light quantity in the peripheral region can be prevented.

If the lower limit of conditional expression (4) is not reached, it will be difficult to make the angle of incidence of off-axis principal rays incident on the sensor small when the effective diameter is small.

If the upper limit of conditional expression (4) is exceeded, while the angle of incidence of off-axis principal rays incident on the sensor will be small, manufacturing of the lens will be difficult.

It is more preferred that the following conditional expression (4') be satisfied instead of conditional expression (4):

$$42°<\theta<58°  \quad (4').$$

It is still more preferred that the following conditional expression (4") be satisfied instead of conditional expression (4):

$$42°<\theta<56°  \quad (4'').$$

It is preferred that the image taking optical system according to the embodiment satisfies the following conditional expression (5):

$$0.29<\Sigma dL/f<0.49  \quad (5),$$

where ΣdL is the sum of the thicknesses of the first to fourth lenses, and f is the focal length of the image taking optical system.

If conditional expression (5) is satisfied, the lenses can be made appropriately thin, and large air gaps can be left between them. Then, the surface shape of the lenses can be designed freely, and therefore it is possible to make the optical system short while making aberrations small.

If the lower limit of conditional expression (5) is not reached, the lenses will become unduly thin, making it difficult to effectively correct aberrations by changing the surface shape. Moreover, manufacturing of the lenses will also be difficult.

If the upper limit of conditional expression (5) is exceeded, the thicknesses of the lenses will become large. Then, while relatively good aberration correction can be achieved without changing the surface shape largely, the overall length will become large, and it will be difficult to make the optical system short.

It is more preferred that the following conditional expression (5') be satisfied instead of conditional expression (5):

$$0.35<\Sigma dL/f<0.49  \quad (5').$$

It is still more preferred that the following conditional expression (5") be satisfied instead of conditional expression (5):

$$0.39<\Sigma dL/f<0.49  \quad (5'').$$

In the image taking optical system according to the embodiment, it is preferred that the second lens be a meniscus lens having a concave surface facing the image side.

If the second lens is a meniscus lens having a concave surface facing the image side, the exit angle of off-axis rays will be large. Then, rays at every image height can be separated. This enables satisfactory correction of off-axis aberrations such as coma and curvature of field.

It is preferred that the image taking optical system according to the embodiment satisfies the following conditional expression (6):

$$1<(r4+r5)/(r4-r5)<1.8  \quad (6),$$

where r4 is the paraxial radius of curvature of the object side surface of the second lens, and r5 is the paraxial radius of curvature of the image side surface of the second lens.

Conditional expression (6) relates to the shape of the second lens.

If the upper limit of conditional expression (6) is exceeded, the paraxial radius of curvature of the image side surface of the second lens will be large, and therefore the exit angle of off-axis rays exiting from the second lens will be small. Therefore, it will be difficult to correct coma.

If the lower limit of conditional expression (6) is not reached, the paraxial radius of curvature of the image side surface of the second lens will be small, and therefore the exit angle of off-axis rays exiting from the second lens will be large. Therefore, it will be difficult to make the optical system short while achieving the telecentricity.

It is more preferred that the following conditional expression (6') be satisfied instead of conditional expression (6):

$$1.2<(r4+r5)/(r4-r5)<1.75  \quad (6').$$

It is still more preferred that the following conditional expression (6") be satisfied instead of conditional expression (6):

$$1.3<(r4+r5)/(r4-r5)<1.7  \quad (6'').$$

It is preferred that the image taking optical system according to the embodiment satisfies the following conditional expression (7):

$$-0.7<(r2+r3)/(r2-r3)<-0.1  \quad (7),$$

where r2 is the paraxial radius of curvature of the object side surface of the first lens, and r3 is the paraxial radius of curvature of the image side surface of the first lens.

Conditional expression (7) relates to the shape of the first lens.

If the lower limit of conditional expression (7) is not reached, the paraxial radius of curvature of the object side surface of the first lens will be small. Then, the angle of incidence of off-axis rays incident on the object side surface of the first lens will be large. Therefore it will be difficult to correct coma.

If the upper limit of conditional expression (7) is exceeded, the paraxial radius of curvature of the object side surface of the first lens will be large. Then, in contrast, the paraxial radius of curvature of the image side surface will be small. Therefore, it will be difficult to make the position of the principal point of the entire optical system close to the object side. In consequence, it will be difficult to make the overall length of the optical system short.

It is more preferred that the following conditional expression (7') be satisfied instead of conditional expression (7):

$$-0.7<(r2+r3)/(r2-r3)<-0.2  \quad (7').$$

It is still more preferred that the following conditional expression (7") be satisfied instead of conditional expression (7):

$$-0.67<(r2+r3)/(r2-r3)<-0.4  \quad (7'').$$

It is preferred that the image taking optical system according to the embodiment satisfies the following conditional expression (8):

$$0.1<(r8+r9)/(r8-r9)<0.75  \quad (8),$$

where r8 is the paraxial radius of curvature of the object side surface of the fourth lens, and r9 is the paraxial radius of curvature of the image side surface of the fourth lens.

If conditional expression (8) is satisfied, the exit angle of off-axis rays exiting from the fourth lens unit can be made small, and a decrease in the light quantity in the peripheral region can be prevented.

If the upper limit of conditional expression (8) is exceeded, the paraxial radius of curvature of the object side surface of the fourth lens will be unduly large. Then, the angle of incidence of off-axis rays incident on the object side surface of the fourth lens will be large. In consequence, coma will tend to be generated. In this case, decreasing the effective diameter of the last lens surface (i.e. the image side surface of the fourth lens) will make correction of coma by this surface difficult. Therefore, high performance cannot be achieved.

If the lower limit of conditional expression (8) is not reached, the negative paraxial radius of curvature of the object side surface of the fourth lens unit will become unduly small. In consequence, the position of the principal point of the fourth lens unit will be made closer to the object side. Therefore, it will be difficult to make the overall length of the optical system short.

It is more preferred that the following conditional expression (8') be satisfied instead of conditional expression (8):

$$0.1<(r8+r9)/(r8-r9)<0.65 \quad (8').$$

It is still more preferred that the following conditional expression (8") be satisfied instead of conditional expression (8):

$$0.2<(r8+r9)/(r8-r9)<0.6 \quad (8").$$

It is preferred that the image taking optical system according to the embodiment satisfies the following conditional expression (9) be satisfied:

$$0.6<f1/f<0.67 \quad (9),$$

where f1 is the focal length of the first lens, and f is the focal length of the entire optical system.

If conditional expression (9) is satisfied, the overall length of the image taking optical system can be made short, and satisfactory correction of aberrations can be achieved.

If the upper limit of conditional expression (9) is exceeded, the refractive power of the first lens will be high. Then, aberrations will be made worse, in particular, spherical aberration will be made worse significantly due to high marginal ray heights. In addition, since the first lens will have the most part of the refractive power of the entire system, the first lens unit will have high sensitivity to manufacturing errors. For these reasons, it is not desirable that the upper limit is exceeded.

If the lower limit of conditional expression (9) is not reached, the refractive power of the first lens will be low. Then, it will be difficult to make the position of the principal point close to the object side, and consequently it will be difficult to make the overall length short.

In the image taking optical system according to the embodiment, it is preferred that the first lens, the second lens, the third lens, and the fourth lens be each made of a resin.

With the use of a resin, the image taking lens can be provided at low price.

An image pickup apparatus according to an embodiment includes the image taking optical system described above and an electronic image pickup element having an image pickup surface, wherein the image taking optical system has an integrated auto-focus mechanism.

The auto-focus mechanism enables focusing onto an object at any distance.

In the image pickup apparatus according to the embodiment, the image taking optical system and the electronic image pickup element are made integral.

The integration of the image pickup element enables conversion of an optical image formed by the image taking optical system into an electrical signal.

In the examples described later, the stop is provided at a position closer to the object side than the image side surface of the first lens. Specifically, the stop is located between the object side surface and the image side surface of the first lens. The description "the stop is located closest to the object side among the optical components of the image taking optical system" shall be read to allow this location of the stop.

Example

In the following, examples of the image taking optical system and the electronic image pickup apparatus according to the present invention will be described in detail with reference to the drawings. It should be understood that the present invention is not limited by the examples.

An image taking optical system according to a first example of the present invention will be described. FIG. 1 is a cross sectional view taken along the optical axis, showing the image taking optical system according to the first example of the present invention in the state in which the image taking optical system is focused on a object point at infinity.

FIGS. 2A, 2B, 2C and 2D show spherical aberration (SA), astigmatism (AS), distortion (DT), and chromatic aberration of magnification (CC) of the image taking optical system according to the first example in the state in which the image taking optical system is focused on an object point at infinity. In FIG. 2, FIY is the image height. The same symbols will be used in the aberration diagrams of the other examples described in the following.

As shown in FIG. 1, the image taking optical system according to the first example includes, in order from the object side, an aperture stop S, a biconvex positive lens L1, a negative meniscus lens L2 having a concave surface facing the image side, a positive meniscus lens L3 having a convex surface facing the image side, and a biconcave negative lens L4. The image taking optical system has a positive refractive power as a whole.

In the cross sectional view of the image taking optical systems according to this and all the other examples described in the following, LPF denotes a low pass filter, CG denotes a cover glass, and I denotes an image pickup surface of the electronic image pickup element.

There are eight aspheric surfaces, which include both surfaces of the biconvex positive lens L1, both surfaces of the negative meniscus lens L2, both surfaces of the positive meniscus lens L3, and both surfaces of the biconcave negative lens L4.

Next, an image taking optical system according to a second example of the present invention will be described. FIG. 3 is a cross sectional view taken along the optical axis, showing the image taking optical system according to the second example of the present invention in the state in which the image taking optical system is focused on a object point at infinity.

FIGS. 4A, 4B, 4C and 4D show spherical aberration, astigmatism, distortion, and chromatic aberration of magnification of the image taking optical system according to the second example in the state in which the image taking optical system is focused on an object point at infinity.

As shown in FIG. 3, the image taking optical system according to the second example includes, in order from the object side, an aperture stop S, a biconvex positive lens L1, a negative meniscus lens L2 having a concave surface facing the image side, a positive meniscus lens L3 having a convex surface facing the image side, and a biconcave negative lens L4. The image taking optical system has a positive refractive power as a whole.

There are eight aspheric surfaces, which include both surfaces of the biconvex positive lens L1, both surfaces of the negative meniscus lens L2, both surfaces of the positive meniscus lens L3, and both surfaces of the biconcave negative lens L4.

Figure 5:
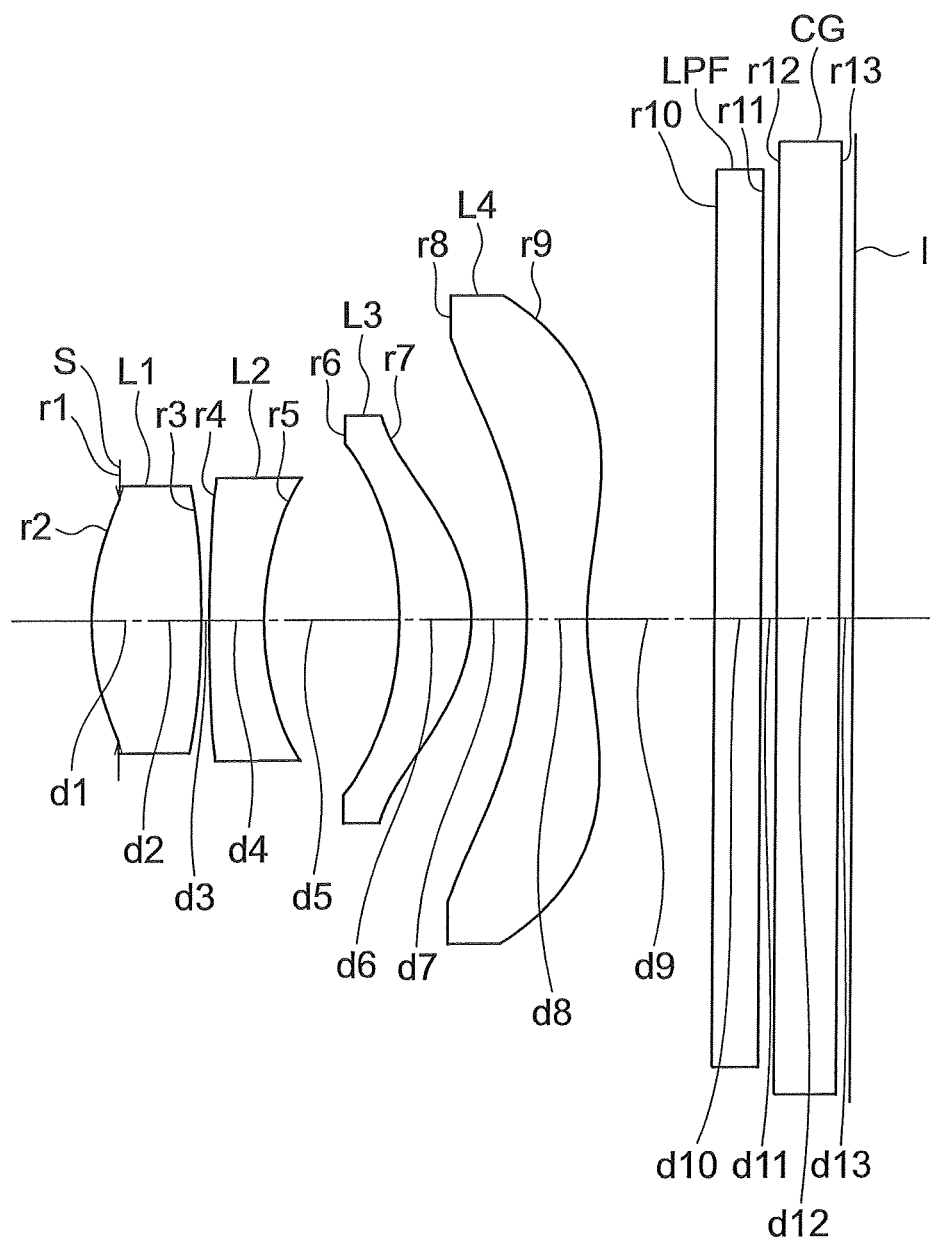
FIG. 5 is cross sectional view taken along the optical axis, showing the optical configuration of an image taking optical system according to a third embodiment of the present invention in the state in which the optical system is focused on an object point at infinity.

Next, an image taking optical system according to a third example of the present invention will be described. FIG. 5 is a cross sectional view taken along the optical axis, showing the image taking optical system according to the third example of the present invention in the state in which the image taking optical system is focused on a object point at infinity.

FIGS. 6A, 6B, 6C and 6D show spherical aberration, astigmatism, distortion, and chromatic aberration of magnification of the image taking optical system according to the third example in the state in which the image taking optical system is focused on an object point at infinity.

As shown in FIG. 5, the image taking optical system according to the third example includes, in order from the object side, an aperture stop S, a biconvex positive lens L1, a negative meniscus lens L2 having a concave surface facing the image side, a positive meniscus lens L3 having a convex surface facing the image side, and a biconcave negative lens L4. The image taking optical system has a positive refractive power as a whole.

There are eight aspheric surfaces, which include both surfaces of the biconvex positive lens L1, both surfaces of the negative meniscus lens L2, both surfaces of the positive meniscus lens L3, and both surfaces of the biconcave negative lens L4.

Figure 7:
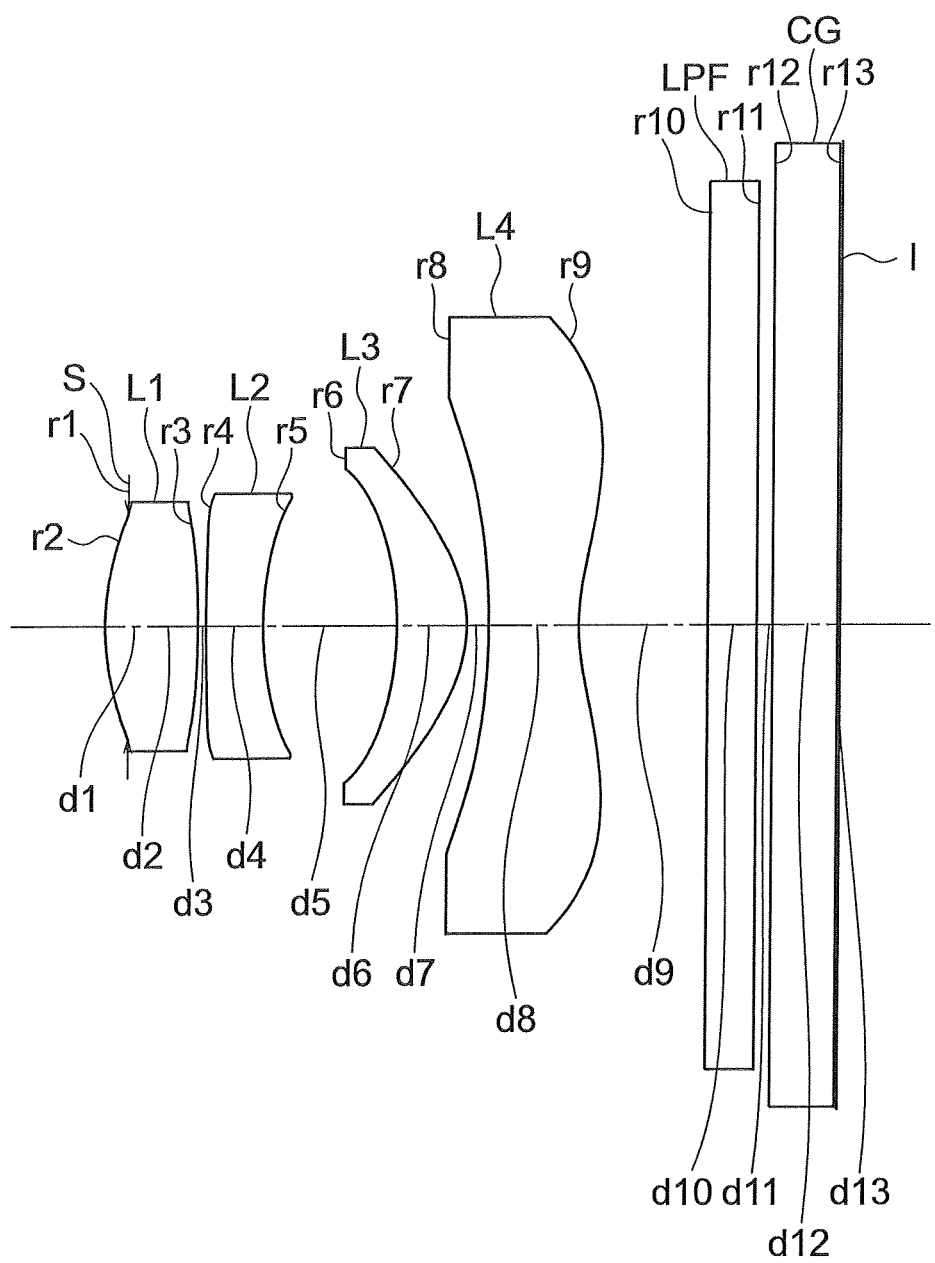
FIG. 7 is cross sectional view taken along the optical axis, showing the optical configuration of an image taking optical system according to a fourth embodiment of the present invention in the state in which the optical system is focused on an object point at infinity.

Next, an image taking optical system according to a fourth example of the present invention will be described. FIG. 7 is a cross sectional view taken along the optical axis, showing the image taking optical system according to the fourth example of the present invention in the state in which the image taking optical system is focused on a object point at infinity.

FIGS. 8A, 8B, 8C and 8D show spherical aberration, astigmatism, distortion, and chromatic aberration of magnification of the image taking optical system according to the fourth example in the state in which the image taking optical system is focused on an object point at infinity.

As shown in FIG. 7, the image taking optical system according to the fourth example includes, in order from the object side, an aperture stop S, a biconvex positive lens L1, a negative meniscus lens L2 having a concave surface facing the image side, a positive meniscus lens L3 having a convex surface facing the image side, and a biconcave negative lens L4. The image taking optical system has a positive refractive power as a whole.

There are eight aspheric surfaces, which include both surfaces of the biconvex positive lens L1, both surfaces of the negative meniscus lens L2, both surfaces of the positive meniscus lens L3, and both surfaces of the biconcave negative lens L4.

Numerical data of each example described above is shown below. Each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. $F_{NO}$ denotes an F number, f denotes a focal length of the entire zoom lens system, FIY denotes an image height. WE denotes a wide angle end, ST denotes an intermediate state, TE denotes a telephoto end, Further, * denotes an aspheric data.

BF (back focus) is a unit which is not expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

These symbols are common in the following numerical examples.

EXAMPLE 1

Unit mm

Surface data

| Surface no. | r | d | nd | vd |
|---|---|---|---|---|
| Object plane | ∞ | ∞ | | |
| 1 (Stop) | ∞ | −0.15 | | |
| 2* | 1.646 | 0.53 | 1.53368 | 55.90 |
| 3* | −8.330 | 0.05 | | |
| 4* | 10.593 | 0.35 | 1.61421 | 25.60 |
| 5* | 2.267 | 0.80 | | |
| 6* | −2.257 | 0.48 | 1.53368 | 55.90 |
| 7* | −0.833 | 0.10 | | |
| 8* | −4.983 | 0.57 | 1.53368 | 55.90 |
| 9* | 1.485 | 0.80 | | |
| 10 | ∞ | 0.30 | 1.51633 | 64.14 |
| 11 | ∞ | 0.10 | | |
| 12 | ∞ | 0.40 | 1.52550 | 62.50 |
| 13 | ∞ | 0.16 | | |
| Image plane | ∞ | | | |

(Light receiving surface)

Aspherical surface data

2nd surface k = −0.029
A4 = −4.96088e−03, A6 = −2.12305e−02, A8 = −4.11858e−02,
A10 = 1.63959e−02, A12 = −2.68626e−02, A14 = −6.01198e−02

3rd surface k = −0.776
A4 = −3.69433e−02, A6 = −4.04058e−02, A8 = −3.45728e−02,
A10 = 7.93270e−02, A12 = −2.39612e−02, A14 = 1.36698e−02

4th surface k = 45.876
A4 = −2.72068e−02, A6 = −3.89683e−02, A8 = 3.96242e−02,
A10 = 8.18005e−02, A12 = 1.43759e−01,
A14 = −1.77875e−01

5th surface k = −1.376
A4 = 5.47671e−02, A6 = 7.01884e−03, A8 = −3.51228e−02,
A10 = 1.65287e−01, A12 = 1.55254e−02,
A14 = −4.13544e−01

6th surface k = 1.042
A4 = −8.36153e−02, A6 = 1.10750e−02, A8 = −1.37440e−02,
A10 = 4.58138e−03, A12 = 3.16333e−02,
A14 = −6.39653e−02

-continued

Unit mm

7th surface k = −3.283
A4 = −1.64893e−01, A6 = 7.81761e−02, A8 = −5.64912e−03,
A10 = 9.85034e−03, A12 = −2.35082e−03, A14 = −1.67209e−03

8th surface k = −1.128
A4 = −5.66426e−03, A6 = −1.29375e−02, A8 = 8.54575e−03,
A10 = −1.74327e−03, A12 = 2.73684e−04, A14 = −4.14068e−05

9th surface k = −13.339
A4 = −7.78939e−02, A6 = 2.26253e−02, A8 = −7.59608e−03,
A10 = 1.54265e−03, A12 = −2.34215e−04, A14 = 1.84758e−05

| Lens total length (in air) | 4.64 |
|---|---|
| BF | 1.76 |
| Focal length | 3.96 |
| ΣdL | 1.93 |

EXAMPLE 2

| Unit mm | | | | |
|---|---|---|---|---|
| Surface data | | | | |
| Surface no. | r | d | nd | vd |
| Object plane | ∞ | ∞ | | |
| 1 (Stop) | ∞ | −0.17 | | |
| 2* | 1.758 | 0.69 | 1.53368 | 55.90 |
| 3* | −7.326 | 0.05 | | |
| 4* | 9.400 | 0.35 | 1.61421 | 25.60 |
| 5* | 2.029 | 0.90 | | |
| 6* | −2.781 | 0.45 | 1.53368 | 55.90 |
| 7* | −0.977 | 0.36 | | |
| 8* | −3.216 | 0.38 | 1.53368 | 55.90 |
| 9* | 2.055 | 0.82 | | |
| 10 | ∞ | 0.30 | 1.51633 | 64.14 |
| 11 | ∞ | 0.10 | | |
| 12 | ∞ | 0.40 | 1.52550 | 62.50 |
| 13 | ∞ | 0.09 | | |
| Image plane | ∞ | | | |
| (Light receiving surface) | | | | |

Aspherical surface data

2nd surface k = −0.201
A4 = −1.28866e−02, A6 = −3.47720e−03, A8 = −3.24761e−02,
A10 = 3.19247e−02, A12 = 8.02252e−03, A14 = −3.41915e−02

3rd surface k = 0.889
A4 = −2.11824e−02, A6 = 1.31154e−02, A8 = −2.90963e−02,
A10 = 1.07345e−01, A12 = 6.71853e−03,
A14 = −7.87256e−02

4th surface k = −0.143
A4 = −2.91966e−02, A6 = −6.82619e−03, A8 = 6.70017e−02,
A10 = 5.37757e−02, A12 = 1.08429e−01,
A14 = −1.63830e−01

5th surface k = −3.334
A4 = 3.59799e−02, A6 = 1.11407e−02, A8 = −6.04249e−02,
A10 = 1.48819e−01, A12 = 3.46020e−02,
A14 = −9.03667e−02

-continued

Unit mm

6th surface k = −0.351
A4 = −7.45371e−02, A6 = 2.95904e−02, A8 = 1.64954e−02,
A10 = −2.07768e−02, A12 = 3.10119e−03,
A14 = 1.91666e−04

7th surface k = −2.985
A4 = −1.20044e−01, A6 = 6.16549e−02, A8 = −8.76365e−03,
A10 = 1.38155e−02, A12 = −5.04586e−04, A14 = −2.25580e−03

8th surface k = −0.752
A4 = −8.58311e−04, A6 = −1.26174e−02, A8 = 8.14929e−03,
A10 = −1.80902e−03, A12 = 2.84880e−04, A14 = −3.17689e−05

9th surface k = −18.502
A4 = −7.38668e−02, A6 = 2.21581e−02, A8 = −7.80092e−03,
A10 = 1.62771e−03, A12 = −1.87294e−04, A14 = 7.70351e−06

| Lens total length (in air) | 4.89 |
|---|---|
| BF | 1.71 |
| Focal length | 4.36 |
| ΣdL | 1.87 |

EXAMPLE 3

| Unit mm | | | | |
|---|---|---|---|---|
| Surface data | | | | |
| Surface no. | r | d | nd | vd |
| Object plane | ∞ | ∞ | | |
| 1 (Stop) | ∞ | −0.18 | | |
| 2* | 1.746 | 0.71 | 1.53368 | 55.90 |
| 3* | −7.202 | 0.05 | | |
| 4* | 9.066 | 0.35 | 1.61421 | 25.60 |
| 5* | 2.030 | 0.88 | | |
| 6* | −2.472 | 0.47 | 1.53368 | 55.90 |
| 7* | −0.970 | 0.36 | | |
| 8* | −3.314 | 0.39 | 1.53368 | 55.90 |
| 9* | 2.052 | 0.82 | | |
| 10 | ∞ | 0.30 | 1.51633 | 64.14 |
| 11 | ∞ | 0.10 | | |
| 12 | ∞ | 0.40 | 1.52550 | 62.50 |
| 13 | ∞ | 0.09 | | |
| Image plane (Light receiving surface) ∞ | | | | |

Aspherical surface data

2nd surface k = −0.149
A4 = −1.42769e−02, A6 = −3.17457e−03, A8 = −3.65727e−02,
A10 = 2.50473e−02, A12 = 1.85103e−03, A14 = −3.17503e−02

3rd surface k = 12.344
A4 = −2.50441e−02, A6 = −4.00530e−03, A8 = −4.20030e−02,
A10 = 9.34805e−02, A12 = 9.21729e−03, A14 = −8.63473e−02

4th surface k = −23.010
A4 = −3.29531e−02, A6 = −1.55123e−02, A8 = 5.42818e−02,
A10 = 4.40793e−02, A12 = 1.03169e−01,
A14 = −1.65748e−01

| Unit mm |
|---|
| 5th surface | k = −3.252
A4 = 3.68465e−02, A6 = 1.18067e−02, A8 = −5.91999e−02,
A10 = 1.47660e−01, A12 = 3.05166e−02,
A14 = −9.61193e−02
6th surface k = −0.285
A4 = −7.48252e−02, A6 = 2.85224e−02, A8 = 1.61827e−02,
A10 = −2.07776e−02, A12 = 3.20637e−03,
A14 = 3.53698e−04
7th surface k = −3.010
A4 = −1.20917e−01, A6 = 6.16599e−02, A8 = −8.74979e−03,
A10 = 1.38125e−02, A12 = −5.14150e−04, A14 = −2.26437e−03
8th surface k = −0.637
A4 = −1.23934e−03, A6 = −1.28362e−02, A8 = 8.11215e−03,
A10 = −1.81316e−03, A12 = 2.85386e−04, A14 = −3.11374e−05
9th surface k = −18.704
A4 = −7.64594e−02, A6 = 2.21797e−02, A8 = −7.78607e−03,
A10 = 1.63118e−03, A12 = −1.86249e−04, A14 = 7.85636e−06

| | |
|---|---|
| Lens total length (in air) | 4.92 |
| BF | 1.71 |
| Focal length | 4.42 |
| ΣdL | 1.92 |

EXAMPLE 4

| Unit mm | | | | |
|---|---|---|---|---|
| Surface data | | | | |
| Surface no. | r | d | nd | vd |
| Object plane | ∞ | ∞ | | |
| 1 (Stop) | ∞ | −0.15 | | |
| 2* | 1.643 | 0.58 | 1.53368 | 55.90 |
| 3* | −6.920 | 0.05 | | |
| 4* | 11.636 | 0.35 | 1.61421 | 25.60 |
| 5* | 2.165 | 0.83 | | |
| 6* | −2.312 | 0.44 | 1.53368 | 55.90 |
| 7* | −0.826 | 0.14 | | |
| 8* | −4.818 | 0.56 | 1.53368 | 55.90 |
| 9* | 1.351 | 0.80 | | |
| 10 | ∞ | 0.30 | 1.51633 | 64.14 |
| 11 | ∞ | 0.10 | | |
| 12 | ∞ | 0.40 | 1.52550 | 62.50 |
| 13 | ∞ | 0.018 | | |
| Image plane | ∞ | | | |
| (Light receiving surface) | | | | |

| Aspherical surface data |
|---|
| 2nd surface | k = −0.300
A4 = −1.41478e−02, A6 = −4.30498e−02, A8 = −6.20290e−02,
A10 = 1.23895e−02, A12 = 1.30949e−03, A14 = 3.28896e−02
3rd surface k = 30.668
A4 = −4.52290e−02, A6 = −6.12369e−02, A8 = −6.13748e−02,
A10 = 8.19403e−02, A12 = 9.13529e−02, A14 = 4.10486e−01

| Unit mm |
|---|
| 4th surface | k = 0.026
A4 = −3.29130e−02, A6 = −4.99091e−02, A8 = 5.93086e−02,
A10 = 1.62547e−01, A12 = 2.54990e−01,
A14 = −1.24494e−01
5th surface k = −2.054
A4 = 4.80952e−02, A6 = −4.84885e−04, A8 = −3.74190e−02,
A10 = 1.83169e−01, A12 = 9.61754e−02,
A14 = −1.86825e−01
6th surface k = 0.670
A4 = −7.85923e−02, A6 = 2.23954e−02, A8 = −1.29784e−02,
A10 = −2.49203e−03, A12 = 2.80051e−02, A14 = −5.81167e−02
7th surface k = −3.250
A4 = −1.62210e−01, A6 = 7.82087e−02, A8 = −8.21294e−03,
A10 = 7.86795e−03, A12 = −3.45497e−03, A14 = −2.30197e−03
8th surface k = 0.472
A4 = −8.23469e−03, A6 = −1.21244e−02, A8 = 8.70248e−03,
A10 = −1.73017e−03, A12 = 2.66096e−04, A14 = −4.87987e−05
9th surface k = −12.600
A4 = −7.45169e−02, A6 = 2.16041e−02, A8 = −7.44833e−03,
A10 = 1.59104e−03, A12 = −2.30646e−04, A14 = 1.77307e−05

| | |
|---|---|
| Lens total length (in air) | 4.568 |
| BF | 1.618 |
| Focal length | 3.96 |
| ΣdL | 1.93 |

Next, values of each of the conditional expressions are shown as below:

| | Example 1 | Example 2 | Example 3 | Example 4 |
|---|---|---|---|---|
| (1) | 0.62 | 0.67 | 0.65 | 0.65 |
| (2) | 2.17 | 2.08 | 2.29 | 2.11 |
| (3) | 0.38 | 0.35 | 0.35 | 0.35 |
| (4) | 48.70° | 54.80° | 53.40° | 44.30° |
| (5) | 0.49 | 0.43 | 0.43 | 0.49 |
| (6) | 1.54 | 1.55 | 1.58 | 1.46 |
| (7) | −0.67 | −0.61 | −0.61 | −0.62 |
| (8) | 0.54 | 0.22 | 0.24 | 0.56 |
| (9) | 0.66 | 0.63 | 0.61 | 0.64 |

Thus, it is possible to use such image taking optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 9:
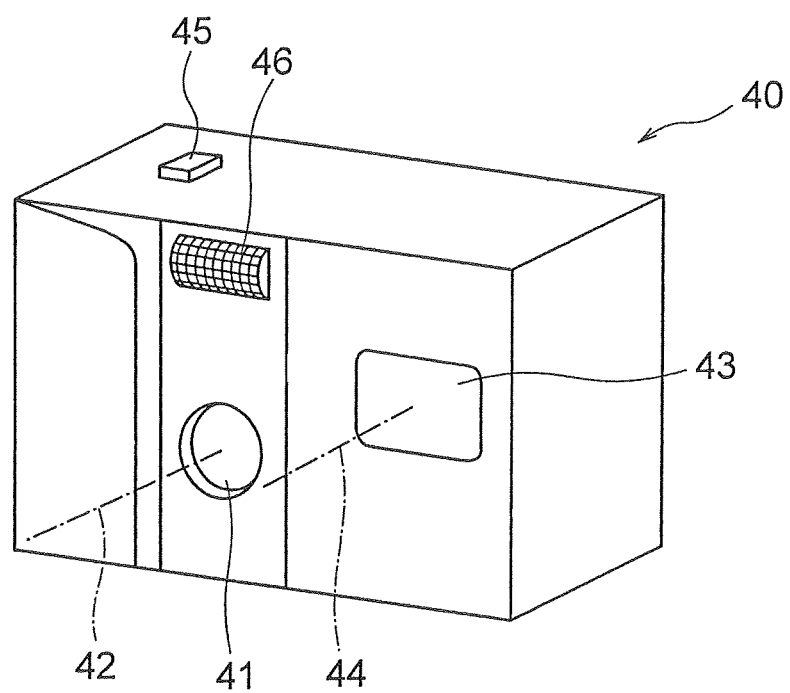
FIG. 9 is a front perspective view showing an outer appearance of a digital camera 40 equipped with an image taking optical system according to the present invention.
Figure 10:
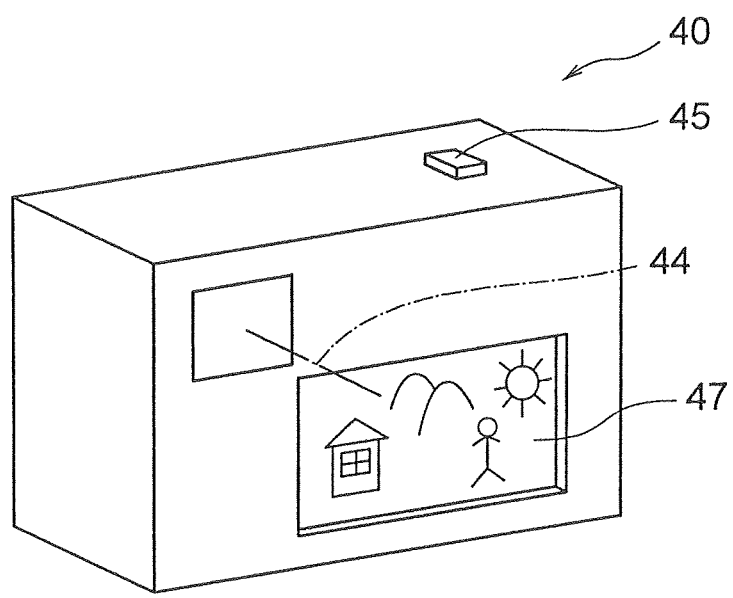
FIG. 10 is a rear perspective view of the digital camera 40.
Figure 11:
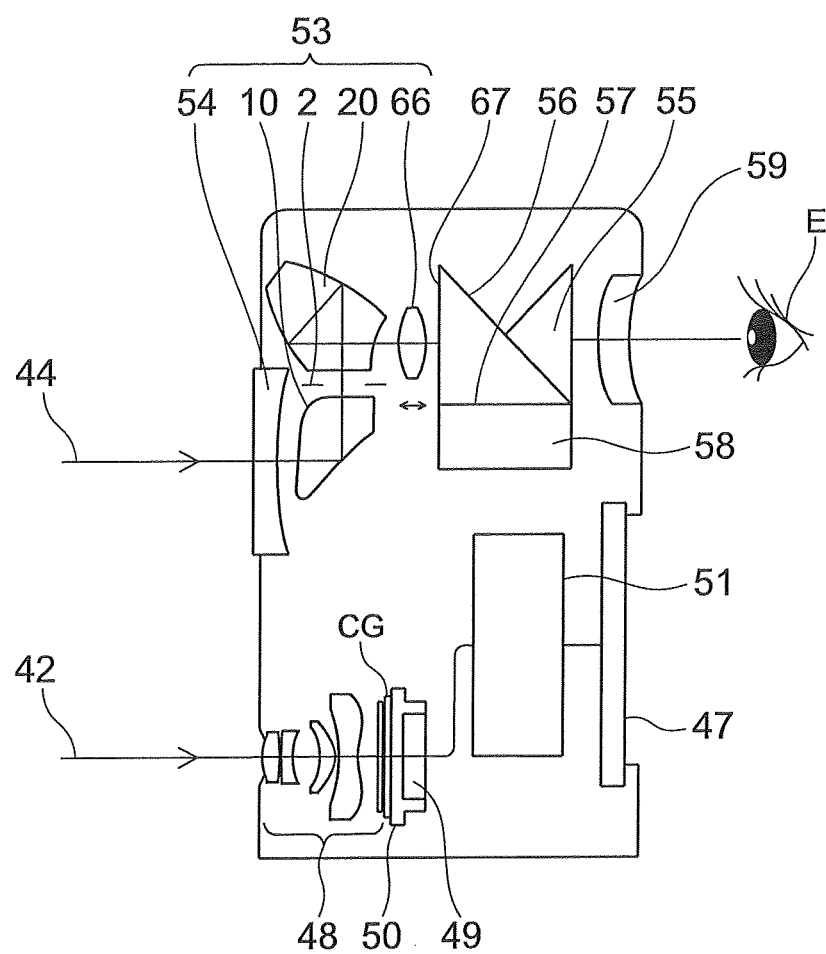
FIG. 11 is a cross sectional view showing the optical construction of the digital camera 40.

In FIG. 9 to FIG. 11 show conceptual diagrams of structures in which the image taking optical system according to the present invention is incorporated in a photographic optical system 41 of a digital camera. FIG. 9 is a frontward perspective view showing an appearance of a digital camera 40, FIG. 10 is a rearward perspective view of the same, and FIG. 11 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 such as the image taking optical system 48 in the first example.

An object image formed by the photographic system 41 is formed on an image pickup surface 50 of a CCD 49. The object image received at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having an image taking optical system with a reduced size and thickness, in which the number of structural components of the photographic optical system 41 is reduced. Further, the present invention could be applied to the above-mentioned collapsible type digital camera as well as a bending type (an optical path reflecting type) digital camera having a bending optical system (optical path reflecting lens).

Figure 12:
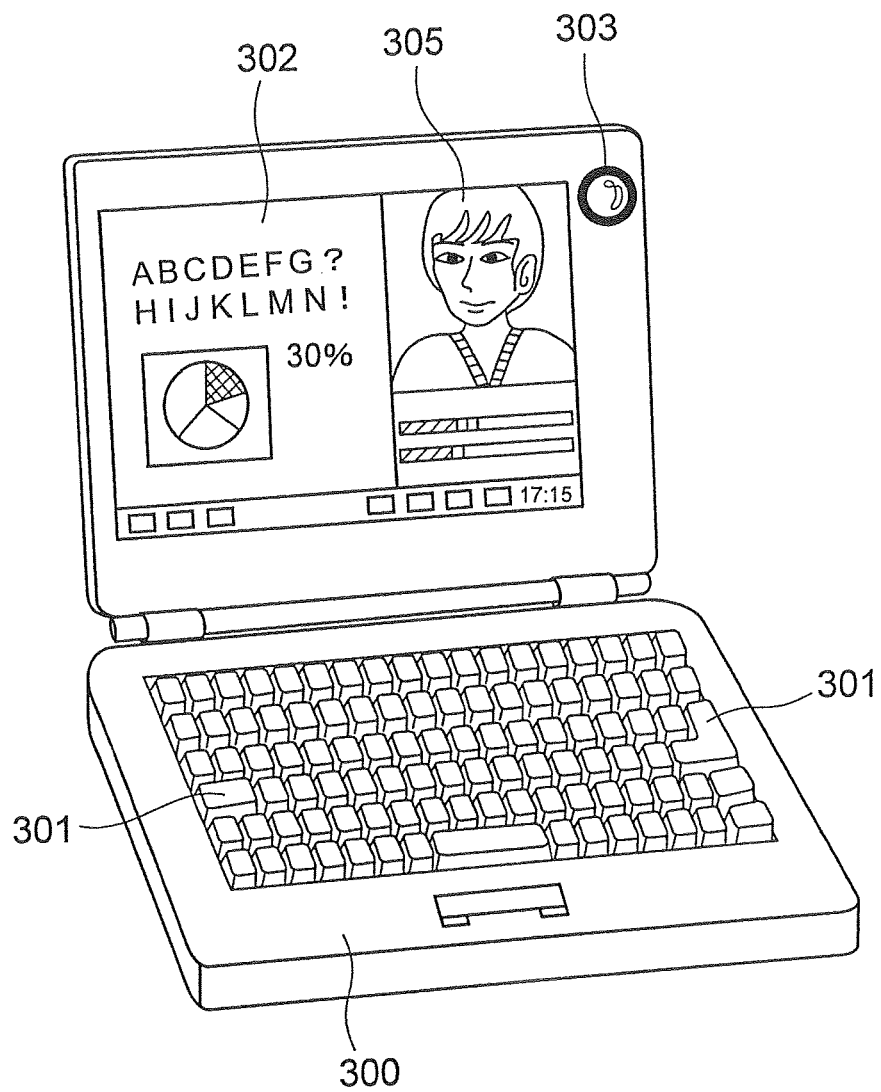
FIG. 12 is a front perspective view showing a personal computer 300 as an example of an information processing apparatus, in which an image taking optical system according to the present invention is provided as an objective optical system, in a state in which the cover is open.
Figure 13:
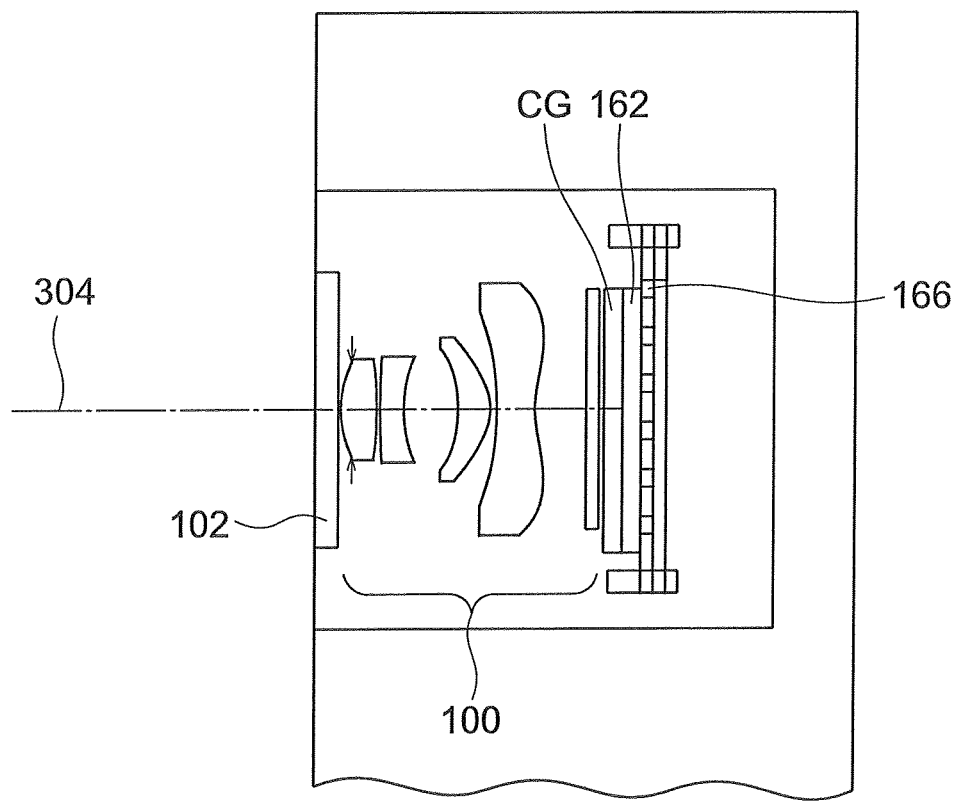
FIG. 13 is a cross sectional view of the taking optical system 303 of the personal computer 300.
Figure 14:
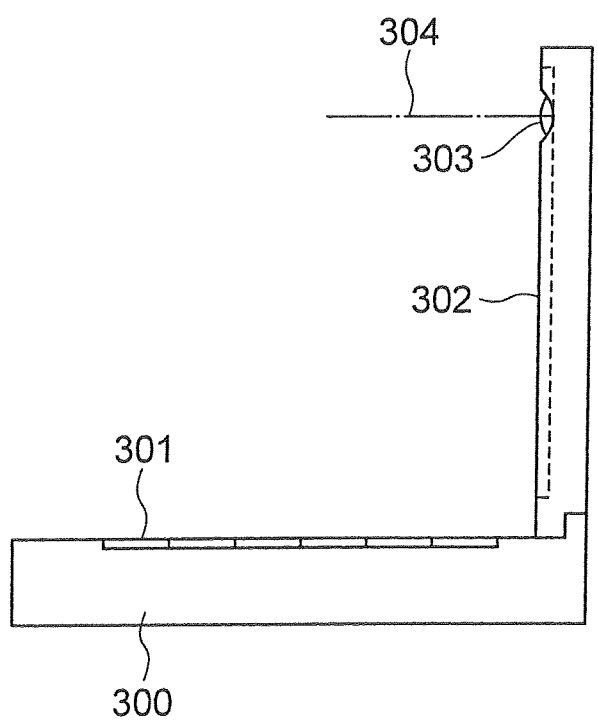
FIG. 14 is a side view of the personal computer 300.

Next, a personal computer which is an example of an information processing apparatus with a built-in image taking optical system as an objective optical system is shown in FIG. 12 to FIG. 14. FIG. 12 is a frontward perspective view of a personal computer 300 with its cover opened, FIG. 13 is a cross-sectional view of a photographic optical system 303 of the personal computer 300, and FIG. 14 is a side view of FIG. 12. As it is shown in FIG. 12 to FIG. 14, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 such as the image taking optical system in the first example for instance, and an electronic image pickup element chip 162 which receives an image, disposed along a photographic optical path 304. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 12, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 15A:
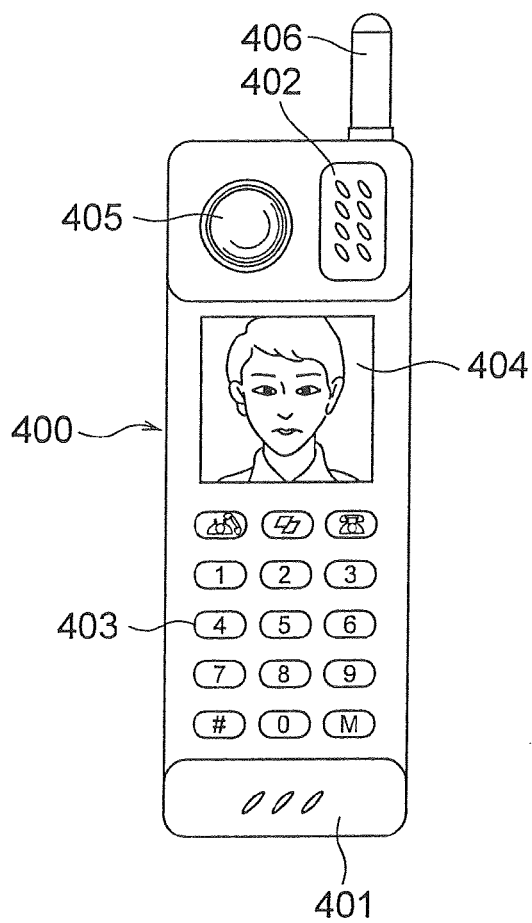
FIGS. 15A, 15B, and 15C show a cellular phone 400 as an example of an information processing apparatus in which an image taking optical system according to the present invention is provided as a photographic optical system, where
Figure 15B:
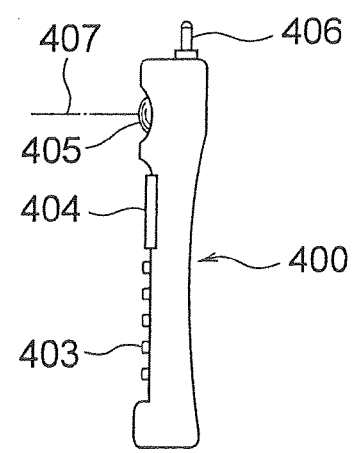
Figure 15C:
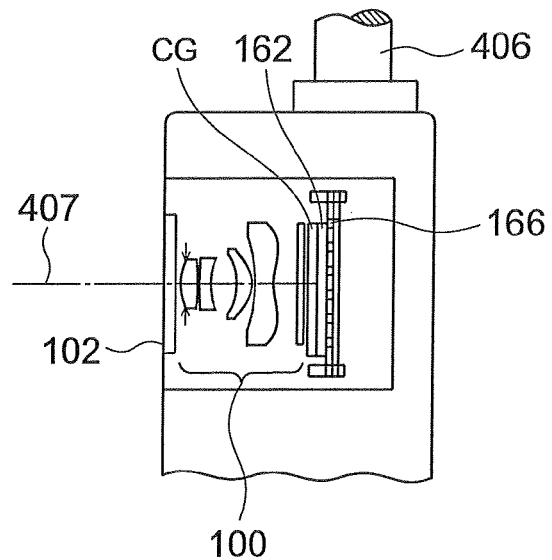

Next, a telephone which is an example of an information processing apparatus in which the image taking optical system of the present invention is built-in as a photographic optical system, particularly a portable telephone which is easy to carry is shown in FIG. 15A, FIG. 15B, and FIG. 15C. FIG. 15A is a front view of a portable telephone 400, FIG. 15B is a side view of the portable telephone 400, and FIG. 15C is a cross-sectional view of a photographic optical system 405. As shown in FIG. 15A to FIG. 15C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first example for instance, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

As described above, the image taking optical system and the image pickup apparatus equipped with the same according to the present invention will be useful when it is desired to make the overall length of the optical system or lens short and to achieve satisfactory correction of aberration while making the effective diameter of the last lens surface small.

In the image taking optical system and the image pickup apparatus equipped with the same according to the present invention, the overall length of the optical system can be made short, and satisfactory correction of aberrations can be achieved, even if the effective diameter of the last lens surface is made small.

What is claimed is:

1. An image taking optical system comprising, in order from the object side, a stop, a first lens having a biconvex shape and having a positive refractive power, a second lens having a concave surface facing the image side and having a negative refractive power, a third lens having a convex surface facing the image side and having a positive refractive power, and a fourth lens having a negative refractive power, wherein the largest air distance is provided between the second lens and the third lens from a first lens disposed closest to the object to a last lens, the image taking optical system satisfies the following conditional expression (1) and conditional expression (2'):

$$0.6 < d5/(d5+d6) < 0.8 \quad (1),$$

$$2 < (r6+r7)/(r6-r7) < 2.8 \quad (2'),$$

where d5 is the air distance between the second lens and the third lens on the optical axis, d6 is the thickness of the third lens, r6 is the paraxial radius of curvature of the object side surface of the third lens, and r7 is the paraxial radius of curvature of the image side surface of the third lens.

2. The image taking optical system according to claim 1, wherein the image taking optical system satisfies the following conditional expression (3), $$0.33 < BF/TTL < 0.50 \quad (3),$$

where BF is the distance from the last lens surface to the paraxial image plane, and TTL is the overall optical length of the image taking optical system.

3. The image taking optical system according to claim 1, wherein the image taking optical system satisfies the following conditional expression (4), $$40° < \theta < 60° \quad (4),$$

where θ is the largest value of the angle formed by a tangential line of the image side surface of the last lens and a line perpendicular to the optical axis within the effective diameter of the lens.

4. The image taking optical system according to claim 1, wherein the image taking optical system satisfies the following conditional expression (5), $$0.29 < \Sigma dL/f < 0.49 \quad (5),$$

where ΣdL is the sum of the thicknesses of the first to fourth lenses, and f is the focal length of the image taking optical system.

5. The image taking optical system according to claim 1, wherein the second lens is a meniscus lens having a concave surface facing the image side.

6. The image taking optical system according to claim 1, wherein the image taking optical system satisfies the following conditional expression (6), $$1 < (r4+r5)/(r4-r5) < 1.8 \quad (6),$$

where r4 is the paraxial radius of curvature of the object side surface of the second lens, and r5 is the paraxial radius of curvature of the image side surface of the second lens.

7. The image taking optical system according to claim 1, wherein the image taking optical system satisfies the following conditional expression (7), $$-0.7 < (r2+r3)/(r2-r3) < -0.1 \quad (7),$$

where r2 is the paraxial radius of curvature of the object side surface of the first lens, and r3 is the paraxial radius of curvature of the image side surface of the first lens.

8. The image taking optical system according to claim 1, wherein the image taking optical system satisfies the following conditional expression (8), $$0.1 < (r8+r9)/(r8-r9) < 0.75 \quad (8),$$

where r8 is the paraxial radius of curvature of the object side surface of the fourth lens, and r9 is the paraxial radius of curvature of the image side surface of the fourth lens.

9. The image taking optical system according to claim 1, wherein the image taking optical system satisfies the following conditional expression (9), $$0.6 < f1/f < 0.67 \quad (9),$$

where f1 is the focal length of the first lens, and f is the focal length of the entire optical system.

10. The image taking optical system according to claim 1, wherein the first lens, the second lens, the third lens, and the fourth lens are each made of a resin.

11. An image pickup apparatus comprising:
an image taking optical system according to claim 1; and
an electronic image pickup element having an image pickup surface,
wherein the image taking optical system has an integrated auto-focus mechanism.

12. The image pickup apparatus according to claim 11, wherein the image taking optical system and the electronic image pickup element are integral.

* * * * *